Feb. 13, 1968  J. CHUNG  3,368,833

HUB AND BUSHING STRUCTURE

Filed June 20, 1966

INVENTOR.
JACKSON CHUNG
BY
M.A. Hobbs
ATTORNEY

# United States Patent Office 3,368,833
Patented Feb. 13, 1968

3,368,833
HUB AND BUSHING STRUCTURE
Jackson Chung, Mishawaka, Ind., assignor to Dodge Manufacturing Corporation, Mishawaka, Ind., a corporation of Indiana
Filed June 20, 1966, Ser. No. 558,901
9 Claims. (Cl. 287—52.06)

ABSTRACT OF THE DISCLOSURE

A hub or bushing structure for a pulley, sheave, gear or sprocket consisting of tapered angular surfaces on the hub and bushing engaging one another, and a plurality of cylindrical bores intersecting the tapered surfaces. The cylindrical bores are provided with threaded portions, either on the hub or on the bushing, and cylindrical screws are threaded in two of the holes and a tapered screw is threaded into the remaining hole to prevent slippage between hub and bushing.

---

A well-known and widely used construction for securing sheaves, pulleys, sprockets, couplings and the like to rotatable shafts consists of a hub having an axially tapered inner surface concentric with and spaced from the shaft, a split bushing disposed between the hub and shaft and having an outer tapered surface corresponding to the taper on the hub, and a plurality of screws threaded into bores intersecting the two tapered surfaces. When the screws are tightened in the bores, the two tapered surfaces are urged together, causing the split bushing to contract around and grip the shaft. This construction for securing the driving or driven elements to a shaft will under all normal operating conditions hold the drive element securely on the shaft and prevent relative rotation between the shaft and element, and the hub and bushing will remain firmly in face-to-face contact with one another. However, when the direction of driving force on the shaft or element is frequently reversed, a tendency for the hub and bushing to rotate slightly back and forth relative to one another develops. If this condition prevails for any extended period of time, the hub becomes loose on the bushing, causing pounding between and damage to the parts, and ultimately causing the drive element to become loose on and possibly disengaged from the shaft. In some installations, a key has been used between the bushing and hub to prevent relative rotation between the shaft and member, but the key does not prevent loosening of the member or axial displacement thereof after loosening has occurred. It is therefore one of the principal objects of the present invention to provide a hub and bushing structure of the foregoing type having a means for rigidly and effectively locking the bushing and hub together after the drive element has been assembled on and secured to the shaft to prevent relative movement between the hub and bushing under the aforementioned adverse operating conditions and thereby to increase the torque capacity of the drive element on a shaft.

Another object of the invention is to provide in a hub and bushing structure of the aforesaid type, an auxiliary securing means which can easily be manipulated to increase and release the gripping and holding action between the hub and bushing and between the bushing and shaft, and which can be incorporated in the basic hub and bushing structure without any appreciable changes in the structure being required.

Still another object of the invention is to provide a relatively simple, easily adjusted mechanism for augmenting the gripping pressure between the hub and bushing, which may or may not be used, depending upon the demands or requirements placed on the drive installation, and which, while applying a force in a direction different from the normal securing screws, is manipulated in substantially the same way as those screws, to apply the increased force for augmenting the holding action and gripping pressure of the usual screws.

Further objects and advantages of the invention will become apparent from the following description and accompanying drawing, wherein.

Figure 1:
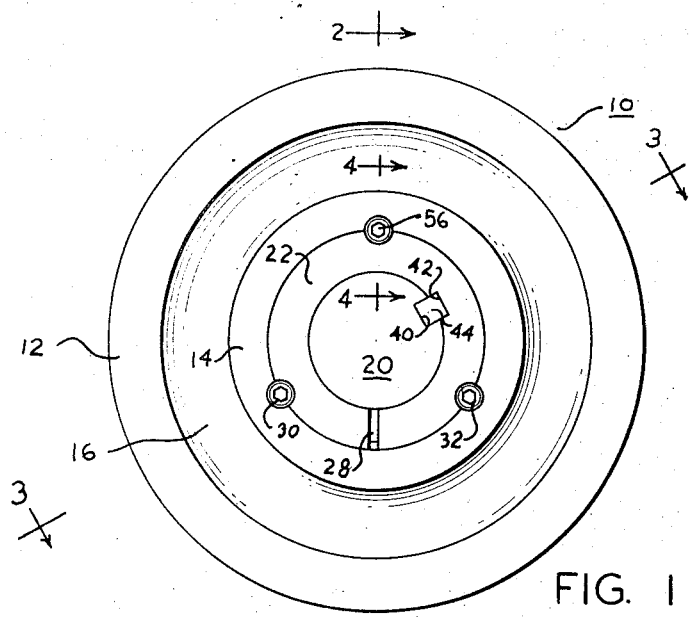
FIGURE 1 is a side elevational view of a sheave having the present hub and bushing structure contained therein and mounted on a shaft.

Referring more specifically to the drawing, wherein one embodiment of the present invention is shown, numeral 10 designates generally a sheave of the multiple V-belt drive type having a rim 12, hub 14, and disc 16 connected integrally with the hub and rim at the longitudinal center thereof. The rim contains a plurality of grooves for V-belts and, while the sheave shown in the drawing contains five grooves for receiving the corresponding number of V-belts, other sized pulleys, i.e. for receiving a different number of belts, may be used equally as well with the present hub and bushing structure. Likewise, the sheave may be varied in diameter over a wide range and may be used either as the driving or driven sheave. The sheave is shown mounted on a rotatable shaft 20 of constant diameter and it may be mounted on the shaft of a motor or on the shaft of the equipment being driven by the motor.

Figures 2, 3:
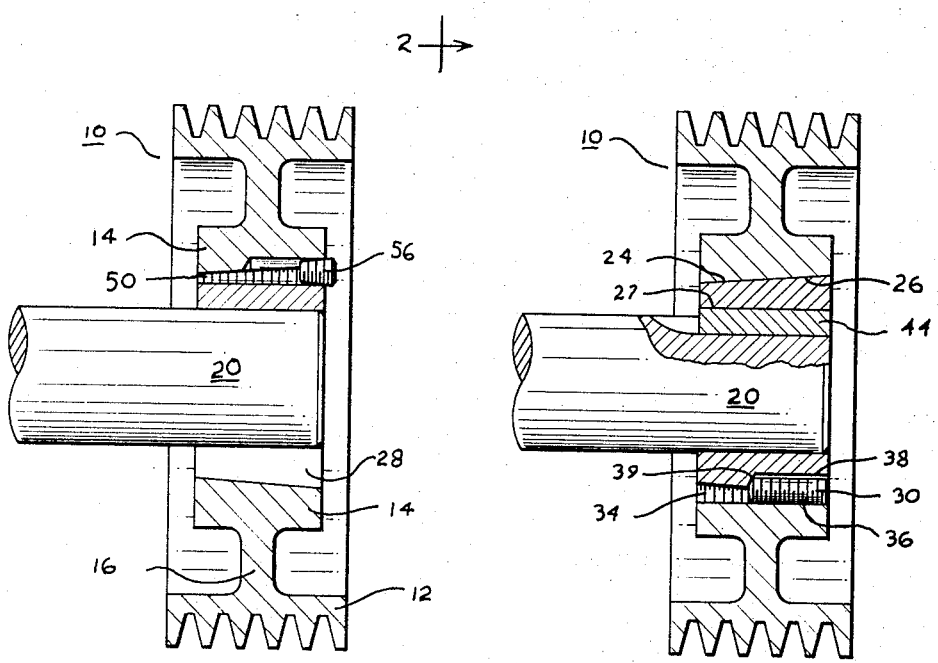
FIGURE 2 is a cross sectional view of the sheave shown in FIGURE 1, the section being taken on line 2—2 of the latter figure.
FIGURE 3 is a cross sectional view of the sheave shown in FIGURE 1, the section being taken on line 3—3 of the latter figure.

The hub 14 extends axially with the shaft 20 and the internal surface thereof is spaced from the shaft and the internal surface 26 is tapered from the right hand side as viewed in FIGURES 2 and 3 to the left hand side thereof, and is constant in both the circumferential and axial directions. Mounted between hub 14 and shaft 20 is a split bushing 22 of substantially the same length as the hub and with an external surface 24 tapered to correspond to the taper on the internal surface 26 on the hub and with an internal surface 27 being straight and parallel with the surface of the shaft. The bushing is continuous throughout with the exception of a radial slot 28 of sufficient width to permit the bushing to contract during installation to grip the shaft firmly, as will be more fully explained hereinafter. Tapered surfaces 24 and 26 of the bushing and hub, respectively, are assembled in face-to-face contact and are adapted to slide relative to one another as the sheave is assembled on the shaft and the bushing secured in place within the hub.

Bushing 22 is contracted into firm engagement with the shaft on which the sheave is mounted, and held rigidly in contact with the hub, by two screws 30 and 32, each being seated in a bore 34, one longitudinal portion 36 of which is formed in the internal surface 26 of hub 14 and the other portion 38 of which is formed in the external surface 24 of bushing 22. Bore 34 intersects contacting surfaces 24 and 26 of the bushing and hub, respectively, preferably approximately equally near the longitudinal center of the bore. Portion 36 of the bore contains screw threads corresponding to those of screws 30 and 32, and portion 38 is smooth, but of a radius of sufficient size to permit the screw to rotate freely in the threaded portion 36 without becoming disengaged therefrom. The length of bore portion 38 is such that the forward end of the screw will readily seat on the inner end portion 39 as the screw is tightened. Thereafter, further tightening of the screw forces the bushing inwardly relative to the hub and urges tapered surface 24 against and along the tapered surface 26, causing the bushing to contract and firmly grip and rigidly adhere to the shaft. While two screws 30 and 32 are used in the embodiment of the invention shown in the drawings, three or more may be used, particularly in large sheaves or other drive elements, though two will usually retain the element on the shaft under normal operating conditions. Under some operating conditions, keyways 40 and 42 and key 44 may be used to augment the holding action of bushing 22 on the shaft.

In some installations, the force applied to the sheave and shaft is frequently reversed, placing substantial torque in one direction and then in another on the element hub and bushing and on the shaft. Under severe operating conditions, this type of action causes a slight slippage or relative rotation between the hub and bushing. Continual action of this type often results in slight simultaneous axial slippage of the bushing in the hub, and hence in a loosening of the sheave on the shaft. Further, the slight rotative slippage between the hub and bushing causes pounding between these parts and may result in damage to the screws 30 and 32 and to the portions of the bushing and hub defining the corresponding bores. In order to prevent slippage between the bushing and hub, a bore 50 similar to bore 34 is provided in adjacent surfaces of hub 14 and bushing 22. In bore 50, however, portion 52 in the bushing is threaded and the wall portion 54 in the hub is smooth and of sufficient radius to permit a screw 56 to enter the bore and rotate therein without becoming disengaged from the screw threads of portion 52. The screw 56 is threaded throughout its length and is provided with a distinct taper extending from its inner end to its outer end, so that as the screw is tightened in bore 50, a wedging action is created between the hub and bushing which effectively prevents the aforementioned relative rotative slippage between the bushing and hub. The screw 56 can be tightened to any degree necessary to prevent the slippage from occurring. The use of the present structure, including the hub, bushing and screw 56, with various drive elements is possible without any substantial change in the basic construction or design.

Figure 4:
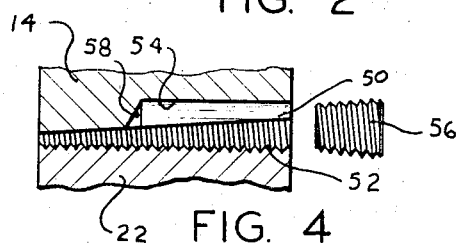
FIGURE 4 is an enlarged fragmentary cross sectional view of a portion of the sheave shown in the preceding figures, showing more clearly the details of the present auxiliary holding means, the section being taken on line 4—4 of FIGURE 1.

A portion of the foregoing auxiliary securing means may also be used to disassemble the sheave and remove it from the shaft. The structure for this dual use includes and abutment at numeral 58 and a straight screw similar to screws 30 and 32 rather than like the tapered screw of numeral 56. After screws 30 and 32 have been removed or loosened, a straight screw is tightened into bore 50 until the inner end of the screw engages abutment 58. Further rotation of the screw forces the bushing, relatively, to the right and the hub to the left, as viewed in FIGURES 2 and 4, thereby tending to separate the contacting tapered surfaces of the two parts, and permitting the bushing to expand and disengage itself from the shaft.

In assembling a sheave or other drive element having the present hub and bushing structure on a shaft, the rim with the hub and bushing are assembled on the shaft in their proper relationship, as illustrated in the drawings. Screws 30 and 32 are then inserted in their respective holes until the inner end engages abutment 39; thereafter tightening the screws causes the bushing to move inwardly with its tapered surface in direct contact with the tapered surface of the hub. As screws 30 and 32 are further tightened, the bushing contracts around the shaft, firmly gripping the shaft, thereby retaining the sheave on the shaft in operative position. If the sheave or other drive element is to be used under conditions where reversal of the torque occurs frequently, the tapered screw 56 is inserted in bore 50 and tightened in the same manner as screws 30 and 32, wedging the screw firmly in bore 50 and rigidly holding the bushing and hub against even slight relative rotation. The tightening of screw 56 likewise creates an additional pressure between the shaft and the bushing, thereby augmenting the force holding the bushing and shaft in nonrotative position.

When the sheave or other drive element is to be disassembled and removed from the shaft, the three screws 30, 32 and 56 are removed from their respective bores and one of screws 30 or 32, or a similar straight screw, is inserted in bore 50 and tightened until the inner end engages abutment 58. Further tightening of the screw causes the bushing to move to the right relative to the hub, thereby loosening and disengaging the bushing from the hub and from the shaft. The hub and outer rim may then easily be removed from the shaft, either as a separate piece or in conjunction with the bushing which releases the shaft upon removal of the screws 30, 32 and 56.

While only one embodiment of the present invention has been described in detail herein, various changes and modifications have been suggested.

I claim:

1. A hub and bushing structure for mounting a drive element on a shaft, comprising a hub having an annular tapered inner surface, a split bushing disposed in said hub and having an annular tapered outer surface for face-to-face contact with the tapered surface on said hub, two spaced uniform cylindrical bores intersecting said tapered surfaces, the portion of each of said bores in said hub having screw threads and the portion of each of said bores in the bushing having an abutment, cylindrical screws threaded into each of said bores and engaging the abutment therein, another uniform cylindrical bore intersecting said tapered surfaces, the portion of said last mentioned bore in said bushing having screw threads and the portion in said hub having an abutment, and a tapered screw threaded into said last mentioned uniform cylindrical bore for preventing slippage between said hub and bushing while the drive element is in operation, said uniform cylindrical bores all having substantially the same diameter so as to receive all of said cylindrical screws interchangeably.

2. The structure defined in claim 1, in which the portion of said last mentioned bore in said hub is provided with a smooth surface for engagement with the screw threads on said tapered screw.

3. The structure defined in claim 2, in which an abutment is provided in said last mentioned bore for engagement by the end of a screw inserted in said bore.

4. The structure defined in claim 1, in which said first mentioned bores are spaced from one another and said last mentioned bore is equally spaced therebetween.

5. The structure defined in claim 1, in which the split in the bushing contains a radially extending axially positioned slot extending from the inside surface to the outside surface.

6. The structure defined in claim 5, in which said first two mentioned bores are equally spaced on opposite sides of said slot.

7. The structure defined in claim 6, in which the said last mentioned bore is positioned diametrically opposite the radial slot in said bushing.

8. The structure defined in claim 7, in which the portion of said last mentioned bore in said hub is provided with a smooth surface for engagement with the screw threads on said tapered screw.

9. The structure defined in claim 8, in which said tapered screw is tapered throughout its length.

References Cited

UNITED STATES PATENTS

| | | |
|---|---|---|
| 2,402,743 | 6/1946 | Firth. |
| 2,446,846 | 8/1948 | Noble. |
| 2,509,711 | 5/1950 | Williams _____ 287—52 |
| 2,550,511 | 4/1951 | Williams _____ 85—155 |
| 2,763,158 | 9/1956 | Firth _____ 287—52.06 X |
| 2,856,211 | 10/1958 | Firth _____ 287—52.06 |

CARL W. TOMLIN, *Primary Examiner.*

ANDREW KUNDRAT, *Assistant Examiner.*